United States Patent Office.

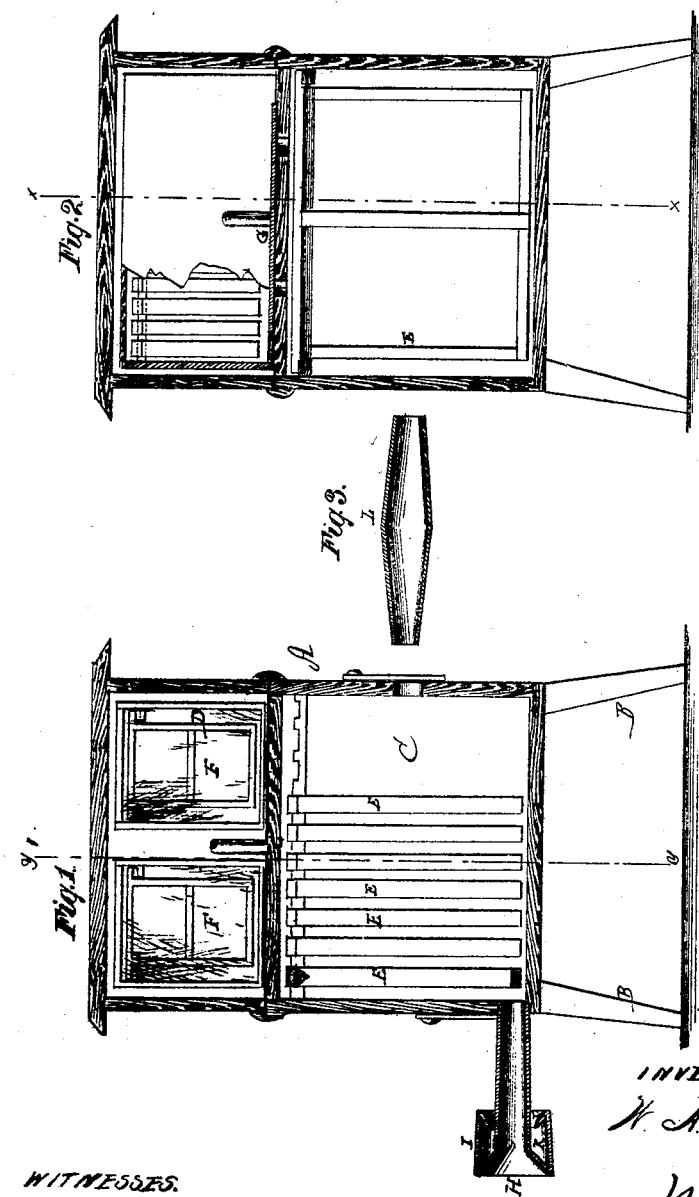

W. A. ELAM, OF MILAN, TENNESSEE.

Letters Patent No. 97,067, dated November 23, 1869.

IMPROVEMENT IN BEE-HIVES.

The Schedule referred to in these Letters Patent and making part of the same.

*To all whom it may concern:*

Be it known that I, W. A. ELAM, of Milan, in the county of Gibson, and State of Tennessee, have invented a new and useful Improvement in Bee-Hives; and I do hereby declare that the following is a full, clear, and exact description thereof, which will enable others skilled in the art to make and use the same, reference being had to the accompanying drawing, forming a part of this specification.

My invention relates to improvements in bee-hives, and consists in a funnel-shaped tube, placed at the entrance of the hive, with its smaller end fitted thereto.

The object of this device is to exclude moths, flies, and other insects from a ready entrance into the hive.

I will now proceed to give a general description of a bee-hive to promote a better understanding of the mode in which my invention operates in connection therewith.

In the accompanying drawing—

Figure 1 represents a vertical section of the hive through the line $x\ x$ of fig. 2.

Figure 2 is a vertical section through the line $y\ y$ of fig. 1.

Figure 3 is a longitudinal section of the swarming-tube.

Similar letters of reference indicate corresponding parts.

A is the hive, which is placed on legs B, and made in two parts, or sections, marked C and D.

E represents honey-comb frames, (more or less in number,) which hang vertically in the lower part C of the hive. These frames are separated from each other, and from the sides and bottom of the hive, as seen in the drawing.

F represents boxes in the upper portion D of the hive.

These boxes are placed directly over the frames E, with suitable orifices on their under sides for the entrance of the bees. They are enclosed by the upper portion D, which lifts off from C.

G is a cover over the top of the frames E, with apertures for allowing the bees to pass through, but which are provided with sliding covers, so that the bees may be confined below when desired.

H is the bee-entrance to the hive. This consists of a funnel-shaped tube, with a short section of tube, I, surrounding the flaring end with a reverse cone, J, which gives entrance into the chamber K. This arrangement is for the purpose of preventing moths and insects from entering the hive.

In crawling down the hive and on to the tube H, seeking for the bee-entrance, the moths or insects reach the chamber K, instead of the entrance. Experience has proved that this device is a perfect protection to the bees against moths and other insects.

L is the swarming-tube, by which the hive of bees is connected with an empty hive, when it is discovered that the bees are about to swarm. By making this connection, and closing the bee-entrance to the working hive until the bees have got a start in the empty hive, and then opening the bee-entrance, it will be found that there are two swarms of bees, without any handling or further trouble.

This hive may be swung in a frame, instead of being supported on legs, as represented in the drawing.

The honey-boxes F have each a series of hanging frames, arranged like those in the lower part of the hive, so that the comb cannot be joined together, and so that any one frame in either section of the hive may be removed without breaking a cell of the honey.

It will thus be seen that some very essential points are gained by this mode of construction. The hive is entirely closed on the bottom. Moths and insects are prevented from entering. Ample provision is made for facilitating the swarming of the bees, without danger of loss or of being stung, and any one of the twenty or thirty frames which the full-sized hive will contain may be removed, with the honey, with the greatest ease, without disturbing the rest and without breaking the honey-cells.

Having thus described my invention,

What I claim as new, and desire to secure by Letters Patent, is—

A hive, provided with a compound tube, having an inner elongated channel for the entrance of the bees, and a surrounding chamber, K, to receive and stop the insects, as they crawl forward from the outside of the hive, all as shown and described.

W. A. ELAM.

Witnesses:
E. H. WILLIAMS,
H. L. DICKINSON.